United States Patent [19]

Goubely et al.

[11] Patent Number: 5,655,746
[45] Date of Patent: Aug. 12, 1997

[54] TWO-PORT FLUID SOLENOID VALVE

[75] Inventors: Aimé Goubely, La Trinité; George Lavigne, Blancquefort; Patrick Petit, Menton, all of France

[73] Assignee: Eaton Corporation, Cleveland, Ohio

[21] Appl. No.: 404,479

[22] Filed: Mar. 14, 1995

[51] Int. Cl.⁶ .................................................. F16K 31/06
[52] U.S. Cl. .............................. 251/129.15; 251/129.21
[58] Field of Search ...................... 251/129.15, 129.02, 251/129.01, 129.21

[56] References Cited

U.S. PATENT DOCUMENTS

| 2,861,594 | 11/1958 | Collins | 251/129.21 X |
|---|---|---|---|
| 3,552,715 | 1/1971 | Bassi | 251/129.21 |
| 4,341,241 | 7/1982 | Baker | 251/129.15 X |
| 4,556,085 | 12/1985 | Warrick | 251/129.21 X |
| 4,646,976 | 3/1987 | Rembold et al. | 251/129.02 X |

*Primary Examiner*—Kevin Lee
*Attorney, Agent, or Firm*—Roger A. Johnston

[57] ABSTRACT

A solenoid operated valve with a magnetic can or jacket with a closed end received over the coil and retained by crimping over a tubular flanged pole washer received over the opposite end of the coil. An inlet orifice is formed in the closed end of the jacket and a radial valving passage communicates the inlet orifice with an outlet between the coil and jacket. A moveable magnetic armature is disposed within the coil and has a non-magnetic planar valving member provided in one end for seating around the inlet orifice when the solenoid is energized.

6 Claims, 1 Drawing Sheet

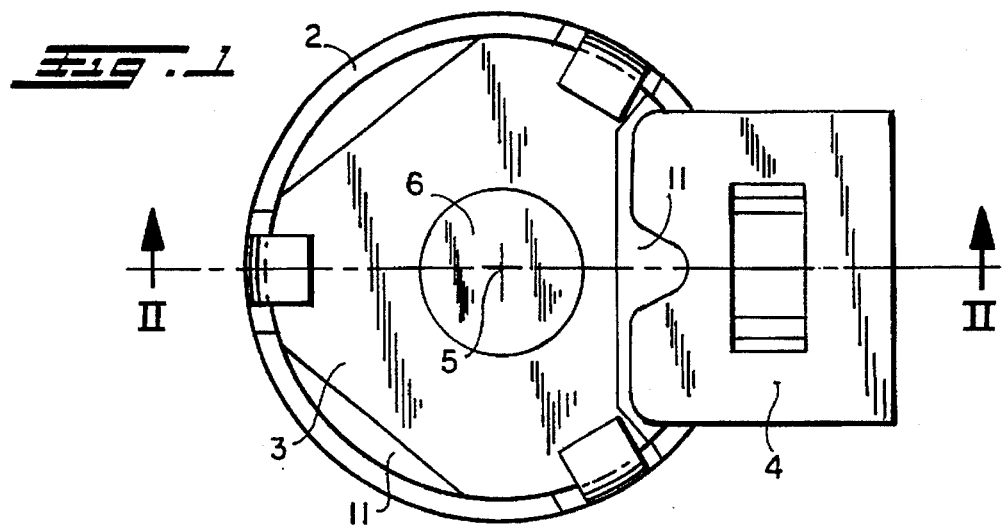
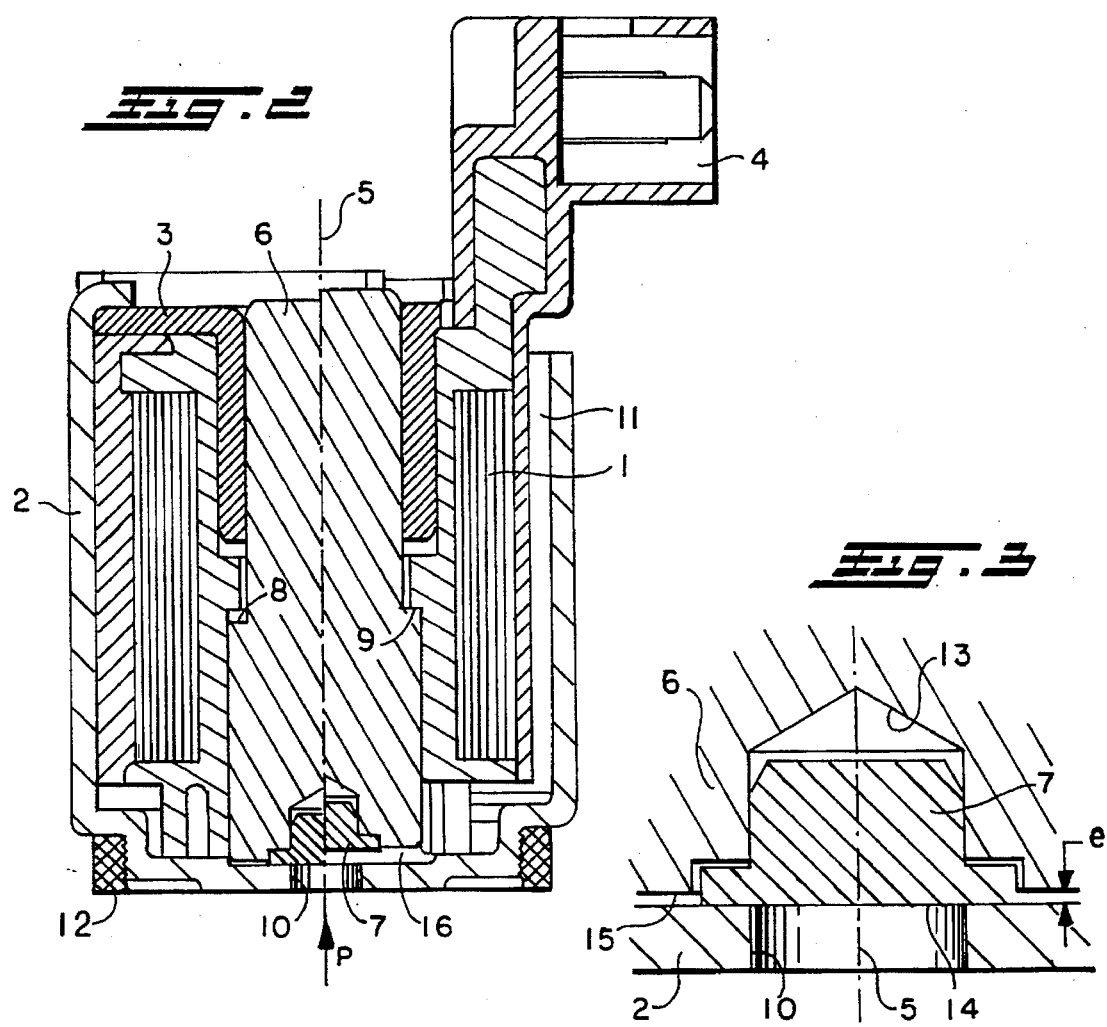

TWO-PORT FLUID SOLENOID VALVE

BACKGROUND OF THE INVENTION

The present invention concerns a two-port solenoid valve for hydraulic or pneumatic fluid, of the type involving an excitation coil capable of being supplied electrically, mounted inside a magnetic circuit in the form of a can or pot and held by a pole washer, as well as a fluid circuit with an intake orifice, at least one discharge orifice and an internal passage capable of being closed or opened by a movable check-valve element, subject to the effect of the pressure of the fluid admitted through the inlet orifice and to the magnetic field generated by the excitation coil when the latter is supplied electrically.

In a two-port solenoid valve of this type, of known design, closure of the internal passage is obtained either by means of a simple ball or by means of a conical or spherical flap. In both cases it is necessary to effect a very precise machining of the fixed internal zone, or fixed seat, that comes in contact, depending on the case, with the ball or with the conical or spherical flap to obtain a tight contact in the closed position of the solenoid valve. It is also necessary to observe a very high machining precision to guarantee the coaxiality of the said internal passage on the one hand and the guidance zone of the ball or conical or spherical flap on the other. Thus, obtaining a satisfactory functioning has required a precise and costly fabrication of the solenoid valve components, with relatively tight dimensional tolerances.

Furthermore, the conical or spherical internal forms of the known valve elements have made it very difficult to reduce the overall dimensions of the valve, and/or to reduce the energy required for its functioning.

Additionally, during the closure of a known solenoid valve of the type involved the occurrence of misalignment of the closure element such as a ball or conical flap has caused slippage, thus frictional stress, between the first contact of the closure element with the fixed seat and a complete closure. Accelerated wear of the internal parts of the solenoid valve has thus resulted.

SUMMARY OF THE INVENTION

The present invention proposes to remedy the above-described shortcomings by furnishing a two-port solenoid valve of simple construction and economical manufacture, and which can function in a very satisfactory manner even with broad dimensional tolerances of its components, and which has reduced dimensions and a relatively low energy required for its functioning, and which has improved wear resistance and thus an improved service life.

For this purpose, the essential object of the invention is a two port solenoid valve for fluid of the type indicated, in which a movable magnetic core, mounted in a sliding manner inside the excitation coil, is equipped at one end with a non-magnetic seat with a plane active surface, interacting with the edge of a fluid inlet orifice provided in the bottom of the magnetic circuit in the form of a can or pot.

The plane active surface of the non-magnetic seat is preferably located slightly projecting with respect to the adjacent terminal face of the movable magnetic core, so as to produce, in the closed position of the solenoid valve, clearance or play between this terminal face of the movable core and the internal face of the bottom of the magnetic circuit.

Advantageously, the closed or open internal passage through the non-magnetic seat is an essentially radial passage, extended by at least one axial flow channel for the fluid between the excitation coil and the side wall of the can or pot-shaped magnetic circuit member or jacket.

Thus, the invention is based essentially on the concept of integrating a flat seat of non-magnetic material with a movable magnetic core subject to the effect of the magnetic field of the excitation coil. The use of a non-magnetic seat makes it possible to avoid an adhesion (due to magnetic remanence) between the seat and the magnetic circuit during interruption of the electric supply to the coil, and thus favors the reopening of the solenoid valve. On the other hand, the presence of the non-magnetic seat makes it possible to avoid contamination by magnetic particles that would stick between this seat and the magnetic circuit and create substantial leakages during the closure of the solenoid valve.

The two-port solenoid valve according to the present invention has the following advantages:

The sealing in the closed position is assured by a flat seat which permits a misalignment of the components while providing tightness, even with broad tolerances.

The fluid inlet orifice is provided directly in the bottom of the magnetic circuit, which permits a very simple production method (by stamping) for the said magnetic circuit, which interacts directly with the element forming the flap or check valve, i.e., the flat non-magnetic seat.

Internal circulation of the fluid is facilitated by the provision of axial flow channels formed directly at the periphery of the excitation coil, which permits a very simple production method by molding of a large part of the solenoid valve.

The tightness obtained by a flat seat facilitates guidance of the movable core directly in the body of the coil.

All spherical or conical internal functional shapes are eliminated.

The present solenoid valve can be obtained by applying simple and economical production techniques that permit the mass production of this valve, e.g., as components of hydraulic or pneumatic control circuits for equipping automobiles.

Finally, as indicated above, the clearance or play between the movable core and the circuit favors the reopening of the solenoid valve and makes the latter relatively insensitive to contamination with magnetic particles, thus resulting in an improvement in the functioning of the valve.

BRIEF DESCRIPTION OF THE DRAWINGS

FIG. 1 is a plan view of a two-port solenoid valve according to the present invention.

FIG. 2 is a cross-sectional view of the solenoid valve along section indicating lines II—II of FIG. 1 showing the armature down in the left-hand portion and moved upwardly in the right-hand portion with respect to centerline or axis 5.

FIG. 3 represents an enlarged detail of a cross-section of the solenoid valve of the present invention.

DETAILED DESCRIPTION

The two-port solenoid valve, represented as a whole in FIGS. 1 and 2, consists of an excitation coil 1 mounted inside a magnetic circuit jacket member or pole piece 2 having the shape of a can or pot, in which it is held by a tubular flanged member or pole washer 3. As shown in FIG. 2, the magnetic circuit jacket member 2 is formed as a one-piece member. The excitation coil 1 is supplied with electric current by means of a connector 4, the molded body of this coil 1 being produced in one piece with the insulating part of the connector 4.

A movable magnetic armature or core 6, equipped at one end with a flat faced non-magnetic seat 7 inserted in a recess provided in armature 6, is mounted in a sliding manner inside the excitation coil 1 along axis 5 of the latter. The movable armature or core 6 has in the region intermediate the ends thereof an annular shoulder 8 that interacts with or registers against a fixed stop formed by another annular shoulder 9 that is part of the body of the coil 1.

In the lower end or bottom of the pole piece magnetic circuit member 2, a circular inlet orifice 10 for fluid is disposed adjacent seat 7 and, centered on the axis 5. At least one and preferably a plurality of axially extending fluid channels 11 are provided between the molded body of the excitation coil 1 and the side wall of the pole piece or magnetic circuit member 2, the channels 11 each communicate with radial passage 16 formed at the end of the solenoid valve which in turn communicates with inlet orifice 10. An annular member 12 preferably threaded over member 2 is mounted at one end of the solenoid valve and surrounds the inlet orifice 10 and assures the external tightness of this solenoid valve.

As shown in FIG. 3 the non-magnetic seat 7 is inserted in a recess or groove 13 found in the lower end of the movable core 6. The plane outer face 14 of the seat 7 projects to a slight distance e in front of the terminal face 15 of the movable core 6. In the absence of electrical excitation of the coil 1, the movable core 6 equipped with a non-magnetic seat 7 is displaced upward (with reference to FIG. 2) under the effect of pressure P of a fluid entering through the inlet orifice 10. The raised movable armature or core 6 then has its annular shoulder 8 contacting or registered against the fixed shoulder 9, thus freeing a section of radial passage 16 between its terminal face 15 and the internal face of the magnetic circuit member 2—see right hand part of FIG. 2 that illustrates this "open" position of the solenoid valve. The fluid entering through orifice 10 can then flow through the passage section 16 and then through the axial channels 11 toward the discharge orifices of these channels 11, which may communicate with a return conduit to a fluid reservoir (not shown).

Upon electrical energization of the coil 1, a magnetic field is created and exerts an axial force downward on the movable armature or core 6. The movable armature or core 6 is then displaced along with its non-magnetic seat 7 downwardly toward the magnetic circuit member 2. At the end of the travel of movable core 6 the non-magnetic seat 7 closes, with its plane external face 14 seated around the rim of the fluid inlet orifice 10—see the left-hand side of FIG. 2 and FIG. 3 illustrating the "closed" position of the solenoid valve. Fluid circulation through the valve is then interrupted and the pressure P of the fluid can increase up to the desired value.

Referring more particularly to FIG. 3, it will be noted that in this "closed" position the movable armature or core 6 and the bottom of the magnetic circuit member 2 are separated by clearance or play e, corresponding to the projection formed by the non-magnetic seat 7. The clearance or play e contributes:

- to favoring the reopening of the fluid circuit when the electrical supply to the excitation coil 1 is cut;
- to reducing the support surfaces of the unit comprising "movable armature or core 6 and seat 7" on the magnetic circuit member 2, for positive sealing in the closed position of the solenoid valve, and
- to preventing magnetic particles from being squeezed between the magnetic armature or core 6 and the magnetic circuit 2 during the closing of the solenoid valve, the movable core 6 being "cleaned" by the passage of the fluid during the absence of a magnetic field.

A two-port solenoid valve as described above can be used in any low pressure hydraulic or pneumatic device or system, either for lowering the pressure in a circuit or a hydraulic or pneumatic element when the solenoid valve is not energized, or for maintaining the pressure in a hydraulic or pneumatic circuit or element when the solenoid valve is energized.

The two-port solenoid valve that is the object of the present invention is particularly applicable to controlling a distributing regulator in an automatic transmission for automobiles.

As is evident, the invention is not limited to the sole embodiment of this two-port fluid solenoid valve as described above by means of example; on the other hand, it covers all embodiment and application variants that observe the same principle. Thus, the details of the axial fluid flow channels, in particular, the number of these channels, can be modified without departing from the spirit of the invention.

We claim:

1. A two-port solenoid valve for hydraulic or pneumatic fluid, of the type involving an excitation coil (1) capable of being supplied electrically (at 4), mounted inside a one-piece magnetic pole member (2) in the shape of a pot-shaped member and held by a pole washer (3), as well as a fluid circuit with an inlet orifice (10), at least one discharge orifice (11) and an internal passage (16) capable of being closed or opened by a movable element that forms a check valve, (7), subject to the effect of the pressure (P) of the fluid admitted by the inlet orifice (10) and to the magnetic field created by the excitation coil (1) when the latter is supplied electrically, characterized in that a movable core (6), mounted in a sliding manner inside the excitation coil (1), is equipped at one end with a non-magnetic seat with a plane active surface (14), cooperating with an edge of said fluid inlet orifice (10) effected in the bottom of the pot-shaped magnetic jacket (2).

2. Two-port fluid solenoid valve according to claim 1, characterized in that the non-magnetic seat with said plane active surface (14) is fitted in a groove (13) effected in one end of the movable magnetic core (6).

3. Two-port fluid solenoid valve according to claim 1 or 2, characterized in that the plane active surface (14) of the non-magnetic seat protrudes slightly with respect to an adjacent face (15) of the movable magnetic core (6) so as to effect, in the closed position of the solenoid valve, a clearance (e) between said adjacent face (15) of the movable core (6) and an internal face of the bottom of the magnetic pole member (2).

4. A two-port electric solenoid operated fluid valve assembly comprising:

(a) a solenoid coil having a one-piece magnetic jacket with one end closed and disposed thereover and retained by a pole washer to provide a magnetic circuit thereabout;

(b) an inlet orifice formed in said jacket and a valving passage communicating said orifice with an outlet passage;

(c) an armature formed of magnetically permeable material and moveably received within said coil, said armature having a non-magnetic planar valving surface provided on one end thereof, said valving surface closing upon said inlet orifice upon electrical energization of said solenoid.

5. The valve assembly defined in claim 4, wherein said armature includes a non-magnetic member mounted on one end thereof with said member having said planar surface disposed to create a clearance between the end of said armature and said jacket when said valving surface closes on said orifice.

6. The valve assembly defined in claim 4, wherein said armature has a recess formed in an end thereof with a non-magnetic member received therein, said member defining said planar valving surface.

* * * * *